US010042989B2

(12) United States Patent
Fasoli et al.

(10) Patent No.: US 10,042,989 B2
(45) Date of Patent: Aug. 7, 2018

(54) DEVICE ACTIVATION

(71) Applicant: Apple Inc., Cupertino, CA (US)

(72) Inventors: Gianpaolo Fasoli, Redwood City, CA (US); Augustin J. Farrugia, Los Altos Hills, CA (US); Mathieu Ciet, Paris (FR); Jean-Francois Riendeau, Campbell, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 14/872,112

(22) Filed: Sep. 30, 2015

(65) Prior Publication Data

US 2016/0357951 A1     Dec. 8, 2016

Related U.S. Application Data

(60) Provisional application No. 62/172,027, filed on Jun. 5, 2015.

(51) Int. Cl.
| | | |
|---|---|---|
| H04L 29/06 | (2006.01) |
| G06F 21/30 | (2013.01) |
| G06F 21/44 | (2013.01) |
| H04L 9/32 | (2006.01) |

(52) U.S. Cl.
CPC .......... *G06F 21/305* (2013.01); *G06F 21/44* (2013.01); *H04L 9/3213* (2013.01)

(58) Field of Classification Search
CPC .. G06F 21/10; G06F 21/62; G06F 2221/2117; H04W 12/08; H04W 8/18
See application file for complete search history.

(56) References Cited

U.S. PATENT DOCUMENTS

| | | | | |
|---|---|---|---|---|
| 2008/0170690 A1* | 7/2008 | Tysowski | ................ | H04L 51/14 380/270 |
| 2012/0079086 A1* | 3/2012 | Miettinen | .............. | G06Q 10/10 709/222 |
| 2014/0344153 A1* | 11/2014 | Raj | .................... | G06Q 20/3821 705/44 |

* cited by examiner

*Primary Examiner* — Tri Tran
(74) *Attorney, Agent, or Firm* — Dickinson Wright RLLP

(57) ABSTRACT

The embodiments set forth systems and techniques to activate and provide other device services for user devices. An activation manager is configured to activate a user device by receiving an activation request for the device, accepting previously stored and encrypted trusted data for the device, getting current data for the device, determining whether the current data compares with the trusted data, and sending an authorization to activate the device when the current data compares favorably with the trusted data. Data can include a seed component divided into seed segments that are each combined with a unique device identifier using varying cryptographic primitives. Each encrypted seed segment and unique device identifier combination can be dedicated to a different device use or service, and can be used separately for device identification for that use or service.

20 Claims, 10 Drawing Sheets

DEVICE ACTIVATION

CROSS-REFERENCE TO RELATED APPLICATIONS

This application claims the benefit of U.S. Provisional Patent Application No. 62/172,027, filed on Jun. 5, 2015, which is incorporated by reference herein in its entirety for all purposes.

FIELD

The described embodiments relate generally to managing services for an electronic device. More particularly, the described embodiments relate to identifying electronic devices for initial activation and other device services.

BACKGROUND

Many electronic devices require an initial device activation process when they are first purchased by or assigned to a user if they are to function fully. Smart phones and tablet devices, for example, are often activated for a buyer at the point of purchase, such as at a retail store. Although these and other electronic devices can still operate without being activated, they may not be able to access or perform some services or functions, such as cell phone service, subscription programming, cloud storage, and other online or networked services and content. In addition to being activated at a purchase point, these electronic devices can also be activated by a user at other times and locations. The integrity of activation and other device service registration can depend upon an accurate identification of the specific device being activated or registered.

Although many device activations and registrations remain legitimate, there can be instances of theft, piracy, impersonation, attacks, and other unauthorized uses that undermine the legitimate distribution, purchase, and use of electronic devices and the activation and other various services that are provided therefor. Current security protocols for device activations and registrations often include the use of a unique serial number or UDID (unique device identifier) and/or private keys for making encrypted signatures. Unfortunately, UDIDs are static codes, and private keys are often chosen from limited sets, such that hackers and other sophisticated parties may still be able to frustrate these safeguards from time to time.

While current device activation and registration techniques and processes have worked well in the past, improvements in providing these functions with greater security and confidence are usually welcome. Accordingly, there is a need for techniques and systems that more securely activate and register individual user devices.

SUMMARY

Representative embodiments set forth herein disclose various systems and techniques for initially activating a user device. In particular, these embodiments set forth various systems and techniques for allowing an activation manager to activate the user device by (1) accepting trusted data that was previously stored on the user device while the user device was at a secure location, (2) determining whether current data that is now on the user device compares favorably with the trusted data that was previously stored on the user device, and (3) activating the user device when the current data compares favorably with the previously stored trusted data. According to some embodiments, the current data can match the trusted data, and each set of data can include a seed component that is divided into multiple seed segments, with each seed segment being combined with a unique device identifier using different cryptographic primitives. In further embodiments, other device services can be provided to the user device by other device service managers by using a similar device verification process. Separate seed segments can be used for each different device service manager or device usage.

This Summary is provided merely for purposes of summarizing some exemplary embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and methods for managing user device activation and other user device services. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
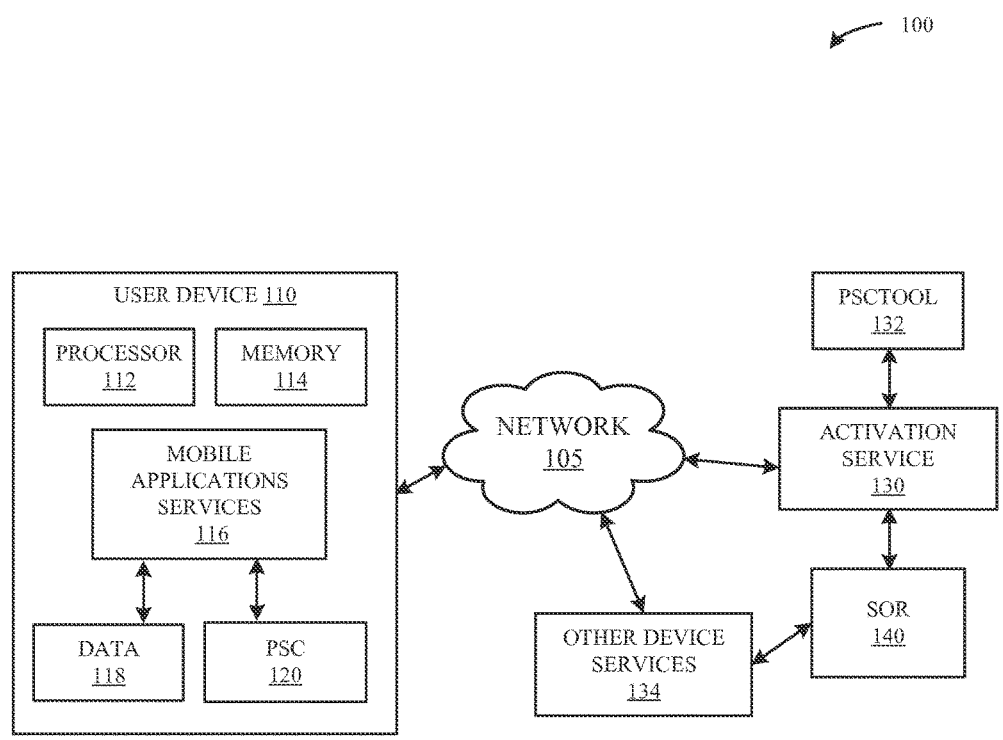
FIG. 1 illustrates in block diagram format various exemplary components of a system adapted to activate an electronic device for a user at a remote location according to various embodiments of the present disclosure.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The integrity of initial activation and other device service registration for a user device can depend upon an accurate identification of the specific device being activated or registered. Theft, piracy, impersonation, attacks, and other unauthorized uses can undermine the legitimate distribution, purchase, and use of electronic devices and the various services that are provided therefor. Current security protocols for user device activations and other device service registrations often include the use of static codes and private keys that can be chosen from limited sets, such that hackers and other sophisticated parties may still be able to frustrate these safeguards from time to time.

Accordingly, the embodiments set forth herein provide various systems and techniques for initially activating a user device or providing other services for a user device. In particular, these embodiments set forth various systems and techniques for allowing an activation manager to activate the user device by (1) accepting trusted data that was previously stored on the user device while the user device was at a secure location, (2) determining whether current data that is now on the user device compares favorably with the trusted data that was previously stored on the user device, and (3) activating the user device when the current data compares favorably with the previously stored trusted data. According to some embodiments, the current data can match the trusted data, and each set of data can include a seed component that is divided into multiple seed segments, with each seed segment being combined with a unique device identifier using different cryptographic primitives. In further embodiments, other device services can be provided to the user device by other device service managers by using a similar device verification process. Separate seed segments can be used for each different device service manager or device usage.

According to some embodiments, the secure location where the trusted data was known to be stored to the user device can be a factory where the user device or at least a portion of the user device was manufactured. In some embodiments, this secure location can be a post-manufacture field location where a trusted source obtained the trusted data from the user device. In various embodiments, the trusted data can be stored at a separate and securely maintained database that stores a plurality of trusted data items for multiple different user devices. The trusted data stored at this separate and securely maintained database can be recorded to the database from a secure manifest to which the trusted data was recorded from the user device itself at the secure location. In various further embodiments, one or more additional trusted data items can be provided onto the user device after the user device has been activated and/or other device services for the user device have been authorized.

Accordingly, the foregoing approaches provide systems and techniques for managing initial device activation and other device services on user devices. A more detailed discussion of these systems and techniques is set forth below and described in conjunction with FIGS. 1-10, which illustrate detailed diagrams of systems, components, and methods that can be used to implement these systems and techniques.

Turning first to FIG. 1, various exemplary components of a system adapted to activate an electronic device for a user at a remote location are illustrated in block diagram format. As will be readily appreciated, the electronic device can be a user device, and these terms can be used interchangeably for purposes of discussion herein. Specifically, FIG. 1 illustrates a high-level overview of the system 100, which can include a user device 110 and a remote activation service 130 with which the user device 110 can communicate via a network 105. The user device 110 can represent an electronic device that needs to be activated to be fully functional, such as a mobile device (e.g., an iPhone®), a tablet device (e.g., an iPad®), or a digital media extender (e.g., an Apple TVA for example. In addition, user device 110 can also represent any other electronic device for which a user desires to access certain device services (for example, iCloud™ by Apple®), such as, for example, a laptop computer, a desktop computer, a digital television, or a digital media recorder, among other possible electronic user devices. Network 105 can include one or more of the Internet, an intranet, a PAN (Personal Area Network), a LAN (Local Area Network), a WAN (Wide Area Network), a MAN (Metropolitan Area Network), a wireless communication network, and the like.

According to the illustration of FIG. 1, the user device 110 can include a processor 112, a memory 114, a mobile applications services component 116, a data component 118 having standard device specific data, and a PSC 120 (proprietary secured component) having specialized device specific data and/or functionality. The processor 112, in conjunction with the memory 114, can be configured to execute the mobile applications services component 116, among other components and applications (not shown) on the user device 110. The memory 114 can include a non-transitory computer readable storage medium configured to store instructions that, when executed by the processor 112, can cause the mobile applications services component 116 to carry out various functions, techniques, or portions thereof as set forth herein. The mobile applications services component 116 can access data component 118 and PSC 120 as part of its functions or techniques. Data component 118 can contain various items of standard device specific data, such as a serial number, UDID, device type, model number, and other device details. PSC 120 can contain various items of specialized device specific data, such as a UID (user identifier), a seed component, and specially hashed or encrypted combinations of the UID with seed segments. These specialized device specific data items can be encrypted and can be not readily accessible or usable by unauthorized third parties. In some alternative embodiments, data component 118 and PSC 120 might be combined into a single component or item.

According to various embodiments, mobile applications services component 116 can access and provide standard device specific data and specialized device specific data from data component 118 and PSC 120 to a remotely located activation service 130, which can be done as part of a device activation process for user device 110. Activation service 130 can include an activation manager or other suitable module adapted to facilitate a device activation process, which process can involve securely confirming the identity of user device 110 by using data from PSC 120, for example. In some embodiments, mobile applications services component 116 can also access and provide standard device specific data and specialized device specific data from data component 118 and PSC 120 to one or more other device services 134, which other device services can include similar device service managers or modules, as may be appropriate. Further embodiments can also provide for other entities to access and provide data from data component 118 and PSC 120 after a device activation process has taken place for user device 110. Such other entities can include, for example, PSC 120 itself, and/or individual clients or applications that might reside on user device 110 and can perform this function directly, which can securely confirm the identity of user device 110 for other purposes.

In various embodiments, activation service 130 and/or one or more other device services 134 can also obtain data from a SOR 140 (System of Records), which can hold trusted data regarding user device 110. The activation service 130 and/or other device service(s) 134 can then compare the SOR data with the mobile application services data to confirm the identity of user device 110. This can be done with the use of a PSCTool 132 or other tool or program that is able to utilize and reconcile data retrieved from PSC 120 with data retrieved from SOR 140. Trusted data held on SOR 140 can be stored and associated with a unique device identifier for the specific user device 110, such as a serial number or UDID. This trusted data can represent that which is known to have resided on the user device 110 at a previous time, such as when the user device was at a location that was known to be secure. In addition to trusted data held with respect to user device 110, SOR 140 can hold trusted data for many other user devices as well.

Figure 2A:
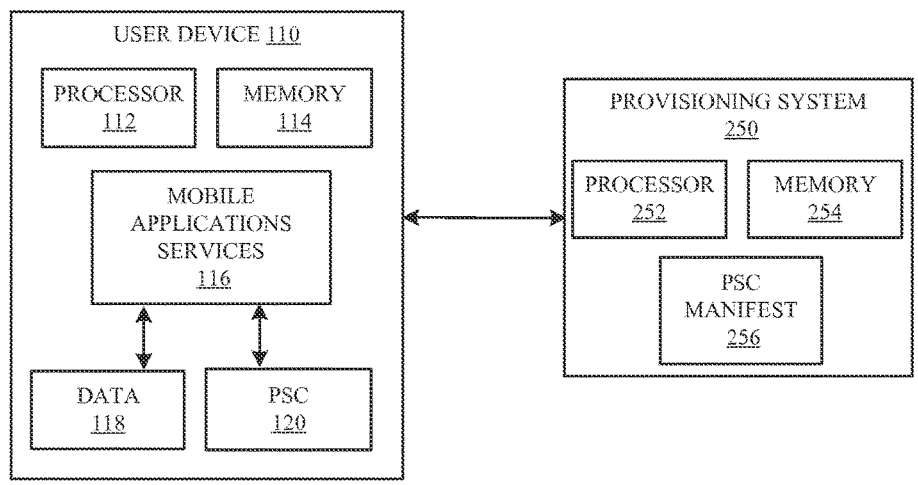
FIGS. 2A and 2B illustrate in block diagram format exemplary components used to transfer user device data in the system of FIG. 1 according to various embodiments of the present disclosure.
Figure 2B:
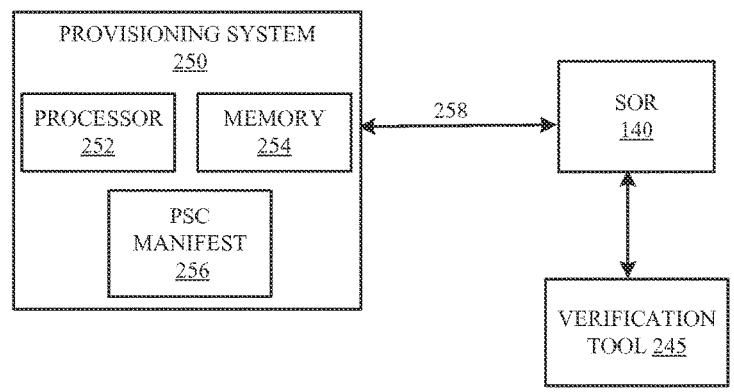

Continuing with FIGS. 2A and 2B, exemplary components that can be used to transfer user device data in the system of FIG. 1 are provided in block diagram format. As shown in FIG. 2A, arrangement 200 depicts a user device 110 such as that which is set forth and described above, as well as a provisioning system 250 that can be used to obtain and transfer trusted data items from the user device 110. As will be readily appreciated, user device 110 can be manufactured at a factory or other similar location where its various components are assembled and basic software is installed and tested. The factory or other location where user device 110 is manufactured can be considered a secure location for purposes of obtaining data from the device. This factory or other secure location can include a provisioning system 250 that is used to collect data. Provisioning system 250 can include various provisioning stations and other components that can be used to collect and check the integrity of data from devices during the manufacturing process, such as user device 110. At a basic level, provisioning system 250 can include at least a processor 252 and a memory 254, among other system components, which can be used to collect and test the integrity of device data. The data that is collected from user device 110 onto provisioning system 250 can be put onto what can be called a PSC manifest 256.

Again, the collected data from user device 110 can include standard device data from data component 118 as well as specialized device data from PSC 120, and this collected data can be that which is being or has been recently stored to user device 110 as the device is being manufactured at a secure location or environment. Provisioning system 250 or an associated component can encrypt and/or provide further security for this obtained data on the PSC manifest 256. Such encryption and/or further security can be provided by fields or other data categories or divisions, such that a breakdown, corruption, or other failure for one field or data item does not destroy all of the other data as well. This added encryption and/or further security measures provided on the obtained user device data at the PSC manifest 256 can also be considered at a later time to ensure the integrity of the data.

The PSC manifest 256 can then be used to transfer data collected from user device 110, as well as similar data from other user devices. The data can be considered "trusted data," in that this data is what is known to have been on the user device 110 at this early point in time. As illustrated shown in FIG. 2B, arrangement 202 depicts provisioning system 250 facilitating the transfer of data contained on PSC manifest 256 to the SOR 140. This can be done by way of a secure or proprietary communication tunnel or communication channel 258, for example. The data from user device 110 can thus be collected to PSC manifest 256 at a secure location in arrangement 200 and then transferred in arrangement 202 from the PSC manifest 256 to SOR 140, where the data can then be stored for future reference. When securely verified and stored at SOR 140 for future reference, this data can be officially considered the correctly transferred and stored "trusted data" for user device 110.

Although these transfer mechanisms are performed in secure environments using trusted mechanisms and channels, there can still be additional checks and balances used to verify that the data for user device 110 that arrives at SOR 140 is accurate. This verification can be done prior to the data being stored at SOR and officially considered trusted data for future use. Accordingly, a verification tool 245 can be used to check the transferred data. This verification tool 245 can be adapted to unpack and check the data after it arrives at SOR 140, such as via secure communication channel 258. Various identification, encryption, formatting, and cross-checking techniques can be used according to the known protocols of how data is formed, formatted, encrypted, and stored at PSC 120, as well as how this data is also encrypted and otherwise handled at PSC manifest 256 in order for verification tool 245 to verify that the unpacked data at SOR 140 is accurate. In this manner, any errors, corruption, malfeasance, or other error in the transfer and handling of data from the user device 110 to the PSC manifest 256 to the SOR 140 via communication channel 258 can be detected. In various embodiments, corruption or errors in a field or other portion of the transferred data can be detected and isolated to such portions, such that other fields or portions of the transferred data that are verified as accurate can still be stored and used as trusted data for user device 110 on SOR 140.

In some embodiments, the secure location for obtaining data from user device 110 can be other than a factory or other environment where the device was first made. That is, the secure location in arrangement 200 can be a post-manufacture field location where a trusted source obtains the data from the user device 110. For example, a trusted person or system can utilize another suitable provisioning system 250, which might be a portable device, to extract or obtain data that resides on the user device 110. Again, this obtained data can include various data items from data component 118 and/or PSC 120, and the obtained data can be stored to a PSC manifest 256 and then sent to SOR 140 by way of a communication channel 258. When done according to proper protocols or procedures, this data collection can also be considered to have been done at a secure location or environment. Again, a verification tool 245 can be used to verify that the data received at SOR 140 is accurate for user device 110.

When done properly for user device 110, either at the factory or at another secure location post-manufacture, various trusted data items are now stored for the user device 110 at a secure database, such as at SOR 140. These stored trusted data items can now be referenced in the future whenever an attempt is made to activate or register other device services for user device 110 or anything that purports to be user device 110. As set forth in greater detail below, these stored trusted data items serve as more than simple static identifiers or codes for user device 110, such that a greater degree of security and confidence can be had in identifying the user device 110 at a remote location at a later time. As will be readily appreciated, this greater degree of confidence in device identification is important in the overall scheme of preventing or lessening fraud, misuse, or other errors in the provision and management of device activation and services across many user devices for many consumers.

Figure 3:
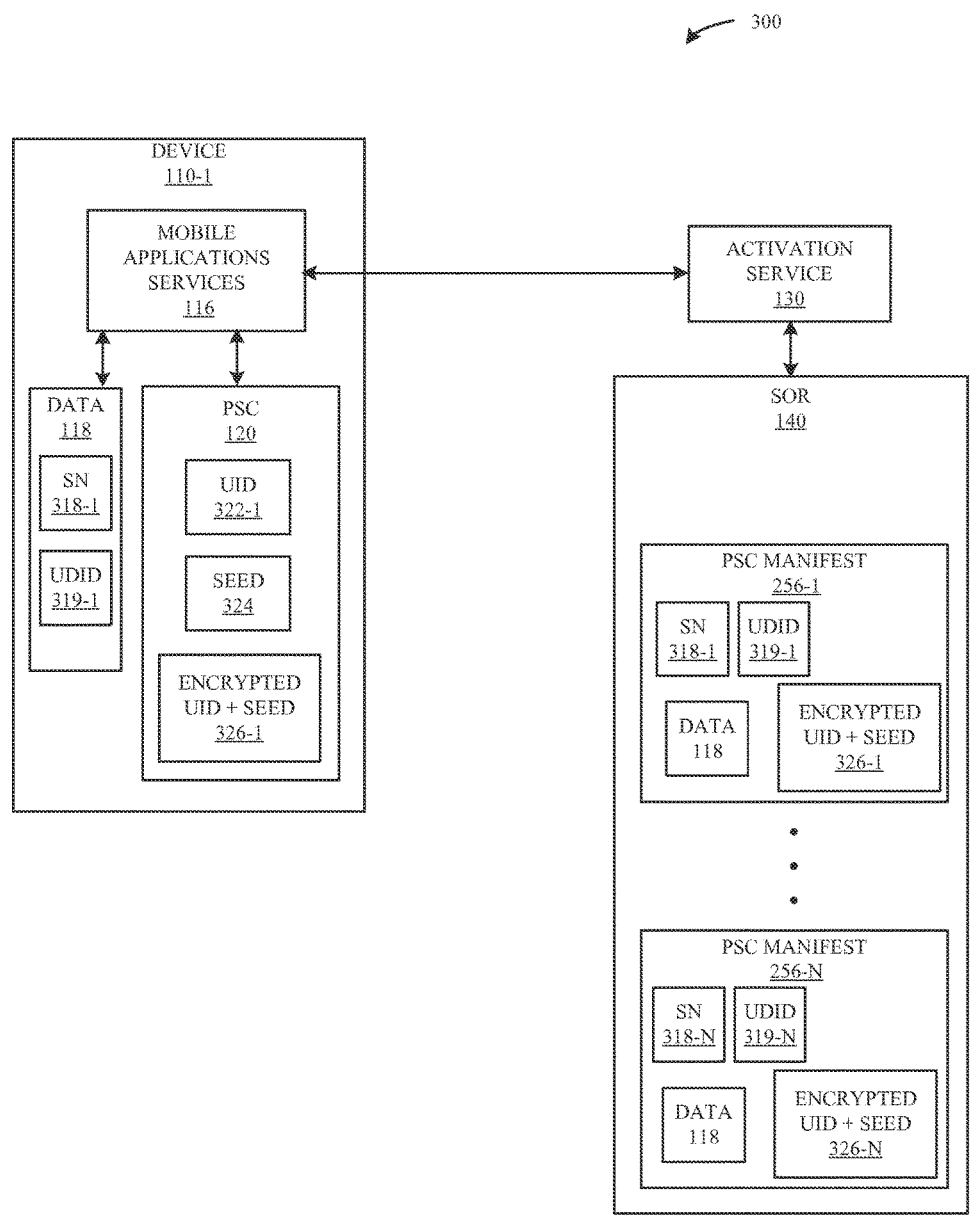
FIG. 3 illustrates in block diagram format a detailed view of particular exemplary components of the system of FIG. 1 according to various embodiments of the present disclosure.

FIG. 3 illustrates in block diagram format a detailed view of particular exemplary components of the system of FIG. 1 according to various embodiments of the present disclosure. As shown in FIG. 3, arrangement 300 depicts a specific user device 110-1 in communication with a remote activation service 130, which in turn has access to an SOR 140 having records for user device 110-1 and other user devices. Other system components, such as a network, are not shown here for purposes of simplicity in illustration. As in the above example, the specific user device 110-1 can include a mobile applications services component 116 that has access to a data component 118 and PSC 120. The data component 118 can include standard device information that is specific to user device 110-1, such as a serial number 318-1 and a UDID 319-1, among other possible data items. PSC 120 can include specialized device information that is also specific to user device 110-1, such as a specific UID 322-1 and a specially encrypted UID and seed combination data item 326-1. A common data seed or seed component 324 can also be contained on PSC 120, with this seed component 324 being the same for numerous user devices, such as all of those user devices being manufactured in a particular run, of a particular type, at a particular time, and/or at a particular location. Seed component 324 can be proprietary in nature, and the exact seed on a given device might also be used as a way to detect details regarding when, where, and how that device was made in the event that different seed components are used for different manufacturing runs.

As illustrated in FIG. 3, arrangement 300 also depicts that the SOR 140 can have stored information or trusted data on a number of user devices (e.g., 110-1 through 110-N) in the form of PSC manifests 256-1 through 256-N. While it will be understood that the trusted data stored on SOR 140 can be formatted or arranged in a manner different than that which is done on the earlier PSC manifest 256, this particular illustrative arrangement will be used for purposes of discussion herein. Specific PSC manifest 256-1 stored on SOR 140 can correspond to user device 110-1 and can therefore contain trusted data that is specific to user device 110-1. As shown, PSC manifest 256-1 stored on SOR 140 can contain various trusted data items, such as serial number 318-1, UDID 319-1, and encrypted UID and seed combination data item 326-1, all of which can be specific to the user device 110-1. PSC manifest 256-1 can also include other data that might be generic to user device 110-1, such as device type, model type, storage capacity, operating system details, original configuration settings, and the like, which generic data might be stored at data component 118. As shown in arrangement 300, the specific data items stored on user device 110-1 and on SOR 140 for user device 110-1 all match or otherwise compare favorably with each other at this initial or early point in time for the user device 110-1.

Figure 4:
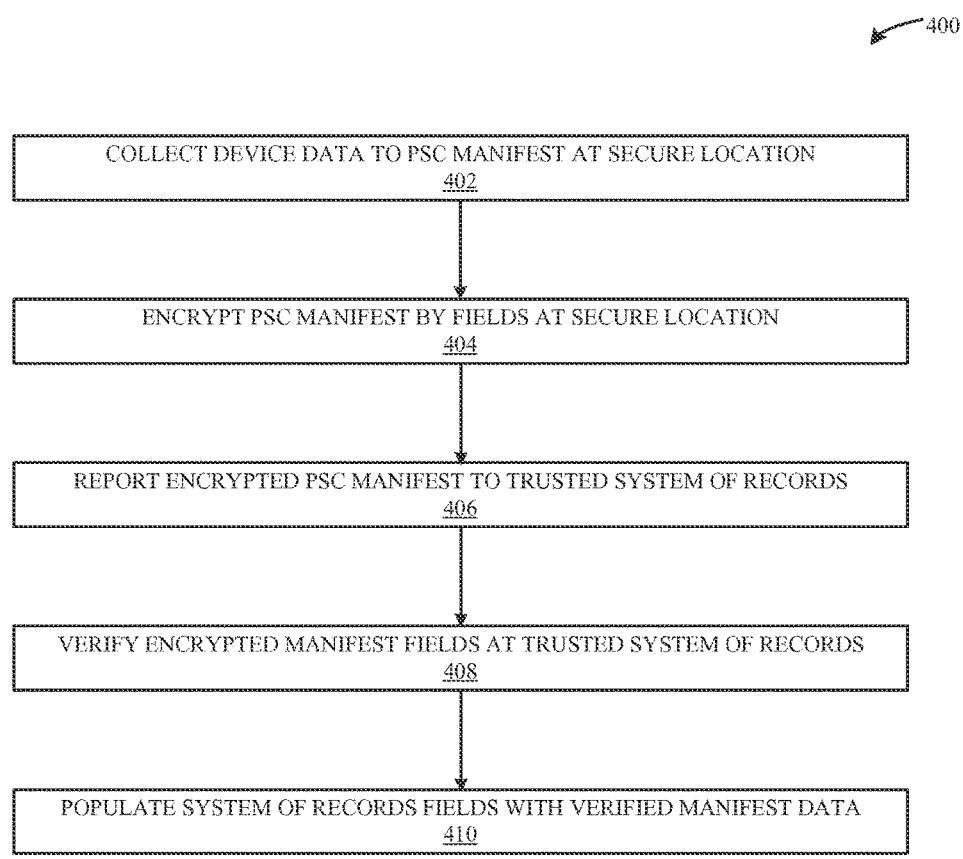
FIG. 4 illustrates a flowchart of an exemplary method for storing trusted data for a user device according to various embodiments of the present disclosure.

Moving now to FIG. 4, a basic flowchart of an exemplary method for storing trusted data for a user device is provided. Method 400 begins at step 402, where user device data is collected to a PSC manifest at a secure location. Again, this can involve the collection of standard device data, such as from a data component 118, and also specialized device data, such as from a PSC 120, both of which can be on a user device 110. Also, the secure location can be a factory where the device is manufactured, or some other location where the device is handled in a relatively secure or trusted manner. At step 404, the PSC manifest, which can be PSC manifest 256, can be encrypted by data fields or other data categories or portions. Again, this can be done to provide added security and verification potential for the data, as well as to allow for some fields or other data categories to be used in the event that others are corrupted or have errors. This encryption step 404 on the PSC manifest can also be performed at the secure location, such as by a provisioning system 250 or other associated component.

At step 406, the encrypted PSC manifest is reported to a trusted database or system of records, such as SOR 140. Again, this can be done via a proprietary or secure communication channel or pipeline, and may involve the reporting of multiple PSC manifests for multiple other user devices at the same time in some embodiments. At step 408, the encrypted fields of the PSC manifest can be verified at the trusted system of records. This can be done by using, for example, a verification tool 145 that is able to account for all of the various formatting, encryption, storage, transfer, further encryption, further transfer and/or other processes performed on the data to that point. At step 410, various fields within the system of records or other secure and trusted database can be populated with verified data from the PSC manifest, upon which method 400 finishes.

Again, this verified data that is stored on the system of records can be considered "trusted data" that was previously stored on the user device 110 for purposes of future device verification, such as for device activation and other device services and activities on the user device 110. In general, this "trusted data" represents only that which is known to have been previously stored on the user device 110 at an earlier time, such as when the user device was in the factory or another secure environment. In many arrangements, it can be preferable to provide an initial protocol handshake prior to device activation between the user device 110 and a separate server, such as where an activation service 130 might reside. The separate server or other item with an activation service 130 can be located remotely from the user device. This protocol handshake prior to device activation can be done at a time where it is reasonably certain that the various data items that are now on the user device 110 (i.e., "current data items") compare favorably with the various data items stored on SOR 140 for the user device 110 (i.e., "trusted data items").

Figure 5:
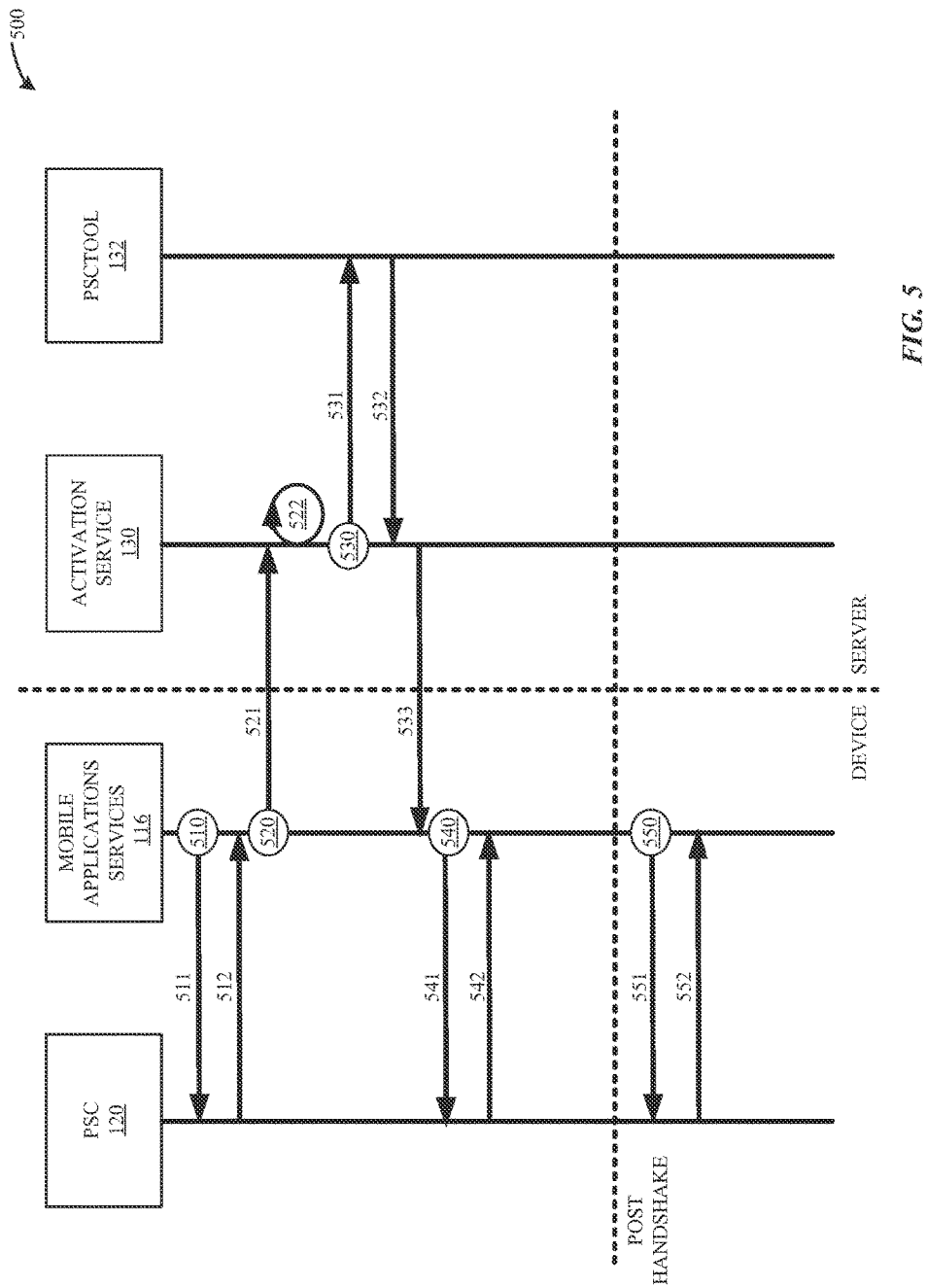
FIG. 5 illustrates a sequence diagram for an exemplary protocol handshake between a user device and an activation service prior to user device activation according to various embodiments of the present disclosure.

FIG. 5 illustrates a sequence diagram for an exemplary protocol handshake between a user device and an activation service prior to user device activation according to various embodiments of the present disclosure. Sequence diagram 500 can involve various actions or events that take place between a PSC 120 and a mobile applications services component 116 on a user device side, and also an activation service 130 and a PSCTool 132 on a server side. Again, the device and server can be remotely located from each other for this exemplary protocol handshake, as well as for other device and server interactions also set forth herein. At a first sequence event 510, the mobile activation services component 116 can send a request 511 to the PSC 120 in order to initiate the handshake process. The PSC 120 can then send a response 512 back to the mobile activation services component 116, where response 512 can include data that establishes a session reference identifier and one or more device identifiers, such as the device serial number and a selected portion of a data seed or other data constant that can be stored at the PSC 120 and can be combined with the UID and then encrypted.

At a following sequence event 520, the mobile activation services component 116 on the device (e.g., user device 110) can send a request 521 to the activation service 130. This request 521 can ask for a handshake between the device and server, and can include the data items that were returned from PSC 120 earlier, such as the session reference identifier, device serial number, and/or the selected portion of a data seed or constant that is combined with the UID and encrypted, among other possible data items. In response to request 521, the activation service 130 at response 522 can then look up the device serial number at a trusted database, such as SOR 140, which can then return the PSC manifest stored at SOR 140 for that device serial number.

At the next sequence event 530, the activation service 130 can send a request 531 to the PSCTool 132. This request 531 can ask for a handshake between the activation service 130 and the PSCTool 132, which request can service the handshake request 521 received from the user device. Accordingly, request 531 can include portions of the returned PSC manifest and various data items, such as the session reference identifier, serial number, and portion of data seed or constant that was returned earlier from PSC 120. Using this information, the PSCTool 132 can then generate one or more tokens, keys and/or other items. At least one of these items can be a specific fixed server side token (e.g., "SKauth") that is to be used for activation for the user device 110 only. This specific SKauth activation token and a separate token identifier can then be passed back to the activation service 130 at response 532 from the PSCTool 132, whereupon the SKauth token and token identifier are then passed back from the activation service 130 to the mobile activation services component 116 at response 533. In addition to activation, a specific SKauth token can be used for future device service requests. That is, the handshake process can be used to establish shared session keys between the user device 110 and the activation service 130 (or other device service). These session keys can be associated with a session identifier and can be removed from the user device 110 when a session is terminated. The session keys may not be stored on activation service 130 or anywhere else on the server side, but are rather bundled securely to form the SKauth token.

At the next sequence event 540, the mobile activation services component 116 sends a request 541 to the PSC 120 to set up the PSC with the specific SKauth activation token, where this request 541 can include at least the SKauth token, the token identifier, and a session reference identifier, for example. The PSC 120 can accept and store these items, and then provide a suitable alert or response 542 back to the mobile activation services component 116 that this has been accomplished, whereupon the initial handshake is then finished. If desired, a following sequence event 550 can involve a request 551 sent from the mobile activation services component 116 to the PSC 120 to destroy the initial session reference identifier or at least disallow any reuse of this identifier to generate another activation key, whereupon the PSC 120 can send a response 552 back to the mobile activation services component 116 confirming when this has been accomplished. At this point, the subject device, which can be user device 110, for example, has its own copy of the SKauth activation token specifically computed just for that device, and is ready to be activated at some later time. This later time can be, for example, at a point of purchase or other similar time that the device has been assigned to a user who is wants to activate the device.

Figure 6:
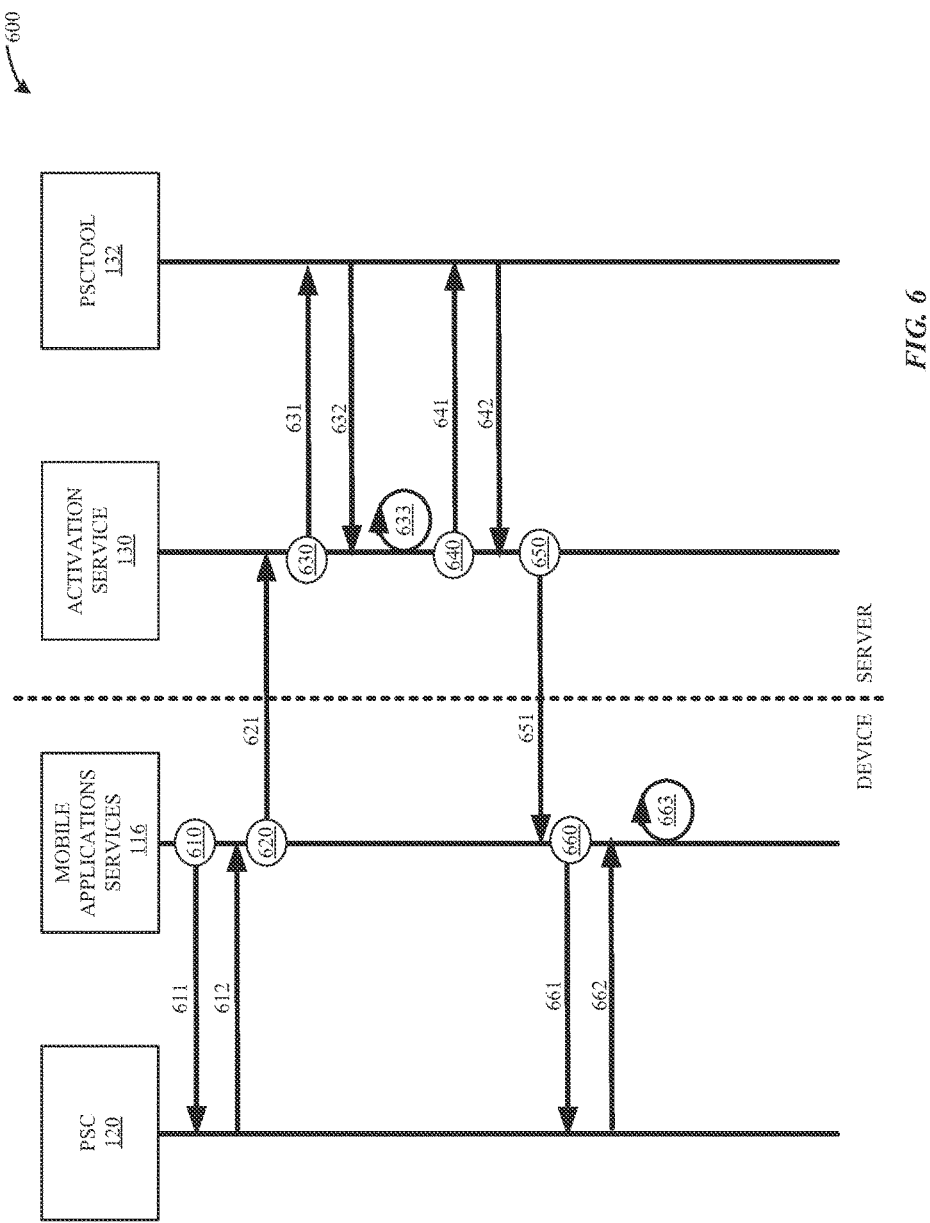
FIG. 6 illustrates a sequence diagram for an exemplary user device activation between a user device and an activation service according to various embodiments of the present disclosure.

FIG. 6 then illustrates a sequence diagram for an exemplary user device activation between a user device and an activation service according to various embodiments of the present disclosure. Sequence diagram 600 can similarly involve various actions or events that take place at the later time between the PSC 120 and the mobile applications services component 116 on the user device side, and also the activation service 130 and the PSCTool 132 on the server side, which again can be located remotely from the device. A device activation process can be initiated at the user device, such as on behalf of the device user, whereupon an activation request can be prepared at the mobile activation services component 116. At a first sequence event 610, the mobile activation services component 116 can send to the PSC 120 a request 611 that includes the activation request and a session reference identifier. The PSC 120 can then send a response 612 back to the mobile activation services component 116 that includes the specific SKauth activation token and a signed activation request. This modification of the activation request can be done using data at PSC 120 that is specific to the device, which can provide further evidence of device authenticity. For example, the activation request can be signed using the signature session key established during the handshake process above.

At a following sequence event 620, the mobile activation services component 116 can send a request 621 to the activation service 130, which request 621 can include the activation request that has been signed using the signature session key. At sequence event 630, the activation service 130 can then send a request 631 to the PSCTool 132 that asks for a verification of the signed activation request. The PSCTool 132 can parse this signed item and return the original SKauth activation token back to the activation service 130 at response 632. Process 633 can then involve the activation service 130 processing the activation request with the original unencrypted activation token and preparing an activation response, which can be a positive (e.g., approved) response when data is confirmed to be valid, or a negative response (e.g., denied) when the data is not valid.

At subsequent sequence event 640, the activation service 130 can send a request 641 to PSCTool 132 that includes the SKauth activation token and the activation response, and asks for a signed and/or encrypted version of the activation response. The PSCTool 132 acts upon request 641 by signing and/or encrypting the activation response, which it then returns to the activation service 130 in response 642. At sequence event 650, the activation service 130 then forwards a response 651 that contains the activation response and the signed and/or encrypted activation response to the mobile activation services component 116. At the following sequence event 660, the mobile activation services component 116 sends the signed and/or encrypted activation response and a request 661 to the PSC 120, which request 661 asks for verification using the session reference identifier, activation response, and signed and/or encrypted activation response. The PSC 120 can then return a response 662 that provides such verification, after which the mobile activation services component 116 can process this additional information at process 663. If all data is verified properly and there are no errors, then the activation response returned from the activation service 130 authorizes the activation of the device, which can be accomplished by the mobile activation services component 116 at process 663. If there are any issues, or the activation response was negative or denied, then the device is not activated at process 663.

Activation service 130 can include an activation manager or other suitable module or component that facilitates the overall device activation process, as detailed above. Similarly, one or more other device services 134 can include a device services manager or other suitable module or component that similarly facilitates the provision of other services or functions to the device, which may involve the use of the same or a similar device identification process or method. From a server side point of view at a device services manager, which can include an activation manager on activation service 130, for example, this process can basically involve (1) accepting trusted data that was previously stored on the user device while the user device was at a secure location, (2) determining whether current data that is now on the user device compares favorably with the trusted data that was previously stored on the user device, and (3) authorizing the requested device services (e.g., activating) for the user device when the current data compares favorably with the previously stored trusted data.

Figure 7:
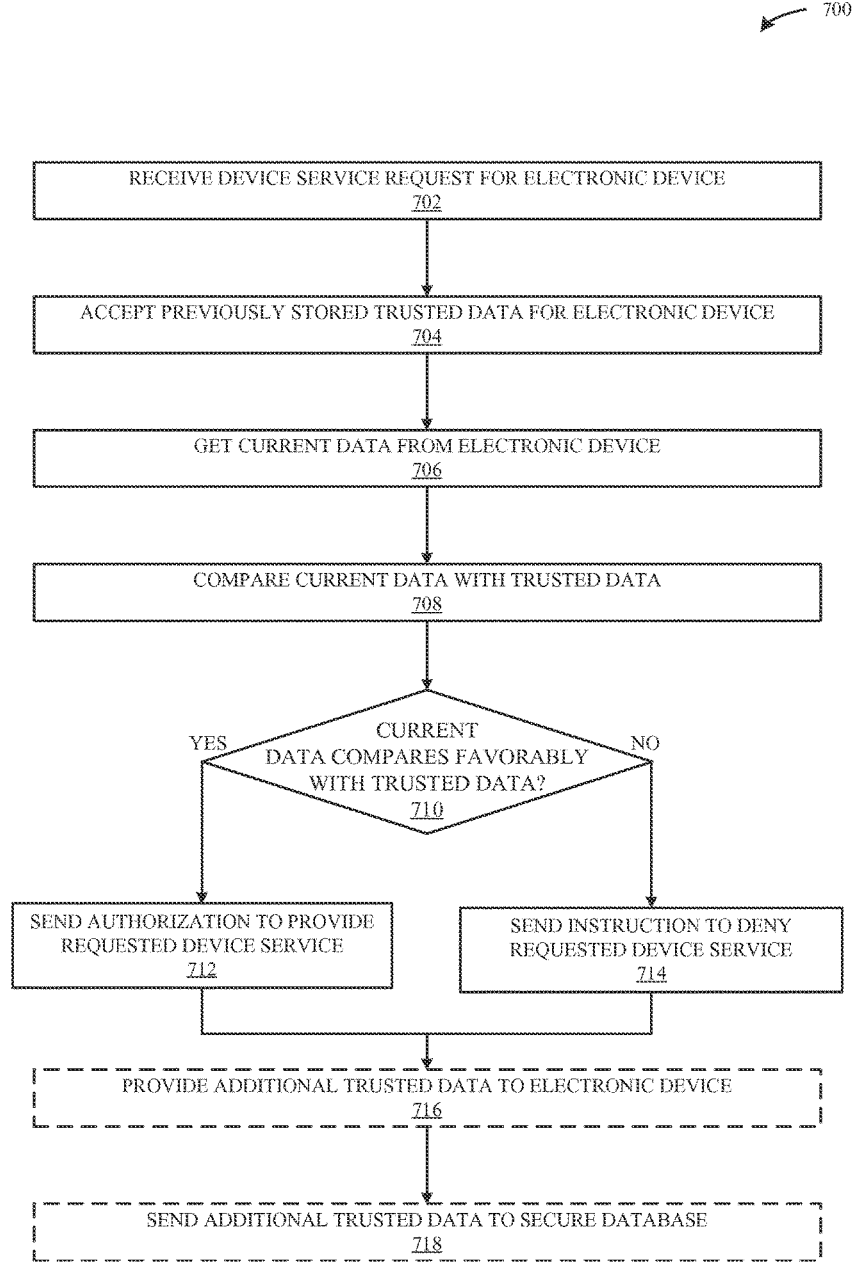
FIG. 7 illustrates a flowchart of an exemplary method performed by a device services manager for providing services to an user device at a remote location according to various embodiments of the present disclosure.

Adding more detail to this basic process, FIG. 7 illustrates a flowchart of an exemplary method performed by a device services manager for providing services to a user device at a remote location. Method 700 starts with step 702, where a request for a device service for the electronic or user device is received by the device services manager. Again, this can correspond to the activation service 130 or other similar device services 134 receiving such a request for activation or other device service. At step 704, the device services manager can accept previously stored trusted data for the electronic device, which trusted data can correspond to that which is stored at SOR 140 or another trusted database. At step 706, the device services manager can get or receive current data that is now on the electronic device. The device services manager can then compare the current data with the trusted data at step 708, after which an inquiry can be made at decision step 710.

At decision step 710, if the current data is the same or otherwise compares favorably to the trusted data, then the method continues to step 712, where the device services manager sends an authorization to provide the requested device service. If the current data does not compare favorably to the trusted data, however, then the method continues to step 714, where the device services manager sends an instruction to deny the requested device service. This process can correspond to process 633 above where the activation service 130 determines whether to approve or deny the activation request. In either situation at step 712 or step 714, optional step 716 can then include the device services manager providing additional trusted data to the electronic device. This can include additional tokens, keys, signed keys, encrypted and signed seed segments, and the like, as set forth below. Subsequent optional step 718 can then include the device services manager also sending that additional trusted data to the secure database, which can be SOR 140, where the additional data can be stored and referenced at some later time for the device.

Figure 8:
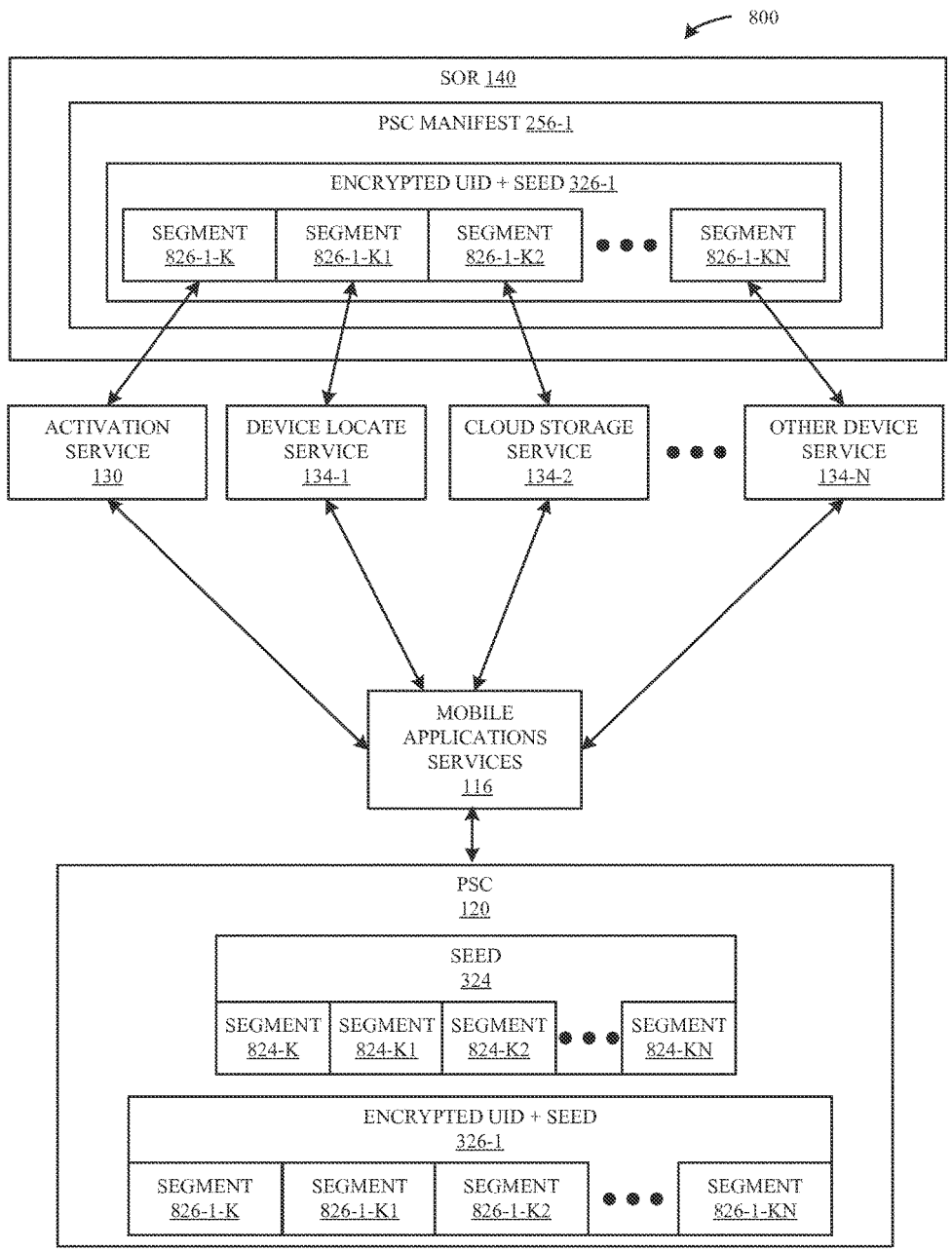
FIG. 8 illustrates in block diagram format an alternative detailed view of particular exemplary components of the system of FIG. 1 according to various embodiments of the present disclosure.

FIG. 8 illustrates in block diagram format an alternative detailed view of particular exemplary components of the system of FIG. 1 according to various embodiments of the present disclosure. As illustrated in FIG. 8, arrangement 800 can include a mobile application services component 116 and PSC 120 for a given device (e.g., user device 110-1), as well as an activation service 130 and various other device services 134-1 through 134-N that are all able to access or utilize a SOR 140. As noted above, PSC 120 can contain a common data seed 324 that can be used for numerous user devices. This data seed 324 can be divided into numerous seed segments 824-K, 824-K1, through 824-KN. In a particular non-limiting descriptive embodiment, data seed 324 can be a 1024 byte seed that is divided into 64 different 16-byte seed segments 824-K through 824-KN. Each of seed segments 824-K through 824-KN can be dedicated to a different device usage or service. For example, seed segment 824-K can be dedicated to device activation service 130, seed segment 824-K1 can be dedicated to a device location service 134-1, seed segment 824-K2 can be dedicated to a cloud storage service 134-2, and so forth through segment 824-KN being dedicated to some other device service 134-N. Each of seed segments 824-KN can be combined with a UID or other unique device identifier for the specific device, and then encrypted using different cryptographic primitives for each seed segment. This process then forms the encrypted UID and seed combination 326-1, which is specific to the user device and which can also be stored at PSC 120. Encrypted UID and seed combination 326-1 can have encrypted UID and seed combination segments 826-1-K, 826-1-K1, through 826-1-KN, which segments also correspond to the various device services, as illustrated.

By encrypting the UID and seed combination by seed segments, it is then possible to discard or ignore seed segments or encrypted UID and seed combination segments that are known or discovered to be corrupted or compromised, while still using the rest of the good encrypted UID and seed combination segments. In this manner, various good but unassigned seed segments can then be assigned, encrypted as a UID and seed combination segment, and used as needed over the life of the user device. For example, if encrypted UID and seed combination segment 826-1-K2 is found to be bad or unusable, then this particular bad segment can be discarded or ignored, and another encrypted UID and seed combination segment can be used in its place. While various encrypted UID and seed combination segments are communicated and verified from time to time, the actual seed or any seed segment itself is preferably never communicated. Rather, the actual seed can be considered a shared secret in some embodiments.

As noted above, the actual handshake or further device verification process for other device services after the initial device activation can be done in a number of ways. Rather than use only the mobile activation services component 116 for these further verification processes, this can be accomplished by using the actual respective application or client that may reside on the user device, or alternatively, may be done by way of the PSC 120 itself. While such other alternatives can be possible, further detailed discussion will now be provided with respect to an example where the mobile activation services component 116 is still used for this process. It will be understood that this example and details can be extrapolated as needed in situations where the PSC 120 or a different application or client operates at the device to allow device services.

Figure 9:
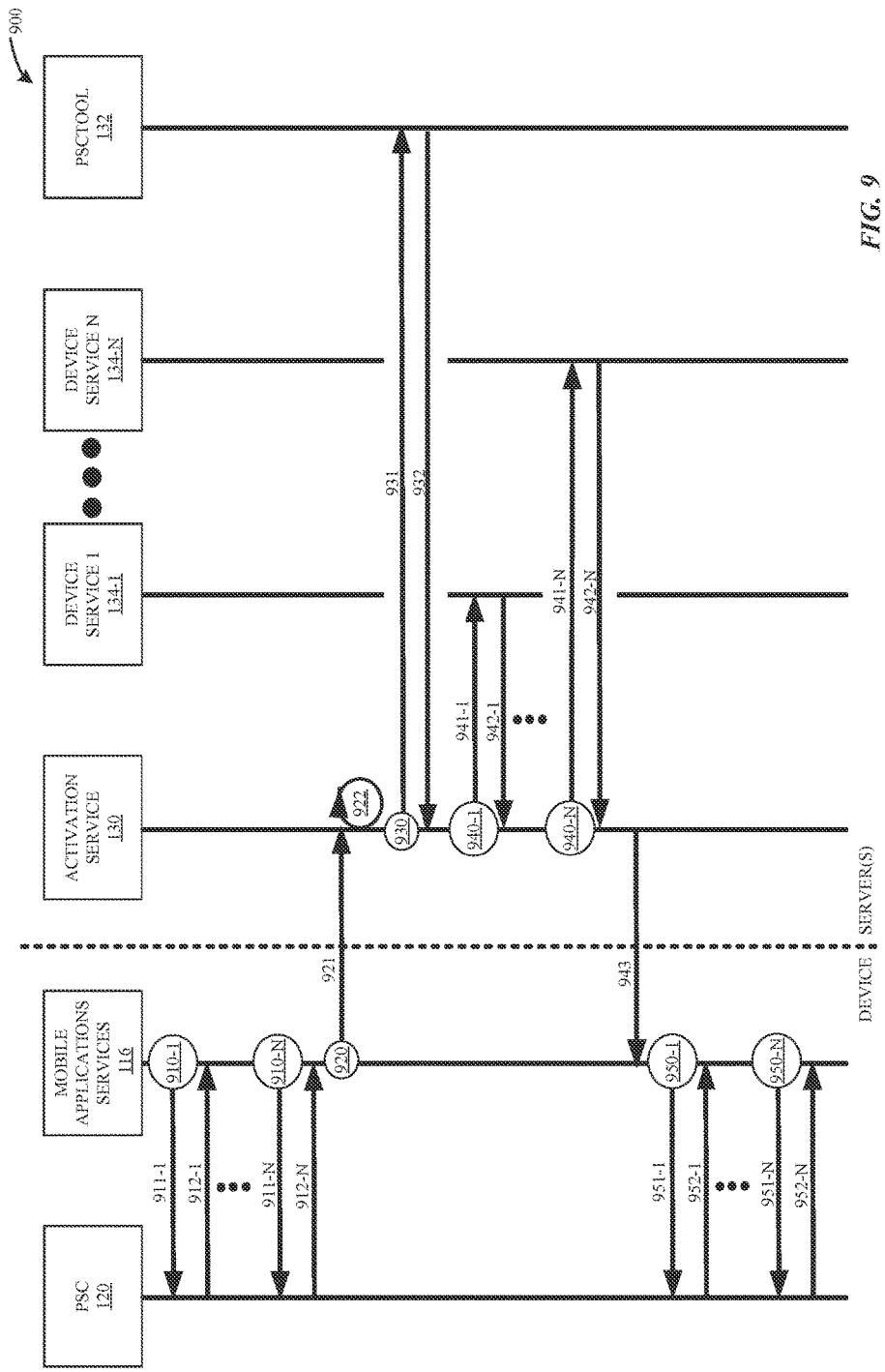
FIG. 9 illustrates a sequence diagram for an exemplary protocol handshake between a user device and multiple device service applications after user device activation according to various embodiments of the present disclosure.

FIG. 9 illustrates a sequence diagram for an exemplary protocol handshake between a user device and multiple device service applications after the user device has already been activated according to various embodiments of the present disclosure. Sequence diagram 900 can involve various actions or events that take place after device activation, such as for the provision of other device services by other applications or device service providers. Pertinent actions and events can again take place at the mobile application services component 116 and the PSC 120 on the device side and also at the activation service 130 and the PSCTool 132 on the server side. Various further pertinent actions and events can also take place on the server side at one or more device services 1 through N, designated as device service 134-1 through device service 134-N, which can be located at one or more additional servers, some or all of which again can be located remotely from the actual user device.

At a first sequence event 910-1, the mobile activation services component 116 can send to the PSC 120 a request 911-1 to initiate a handshake process for a first device service (e.g., device service 1). The PSC 120 can then send a response 912-1 back to the mobile activation services component 116 that includes a session reference identifier and one or more device identifiers, such as the device serial number and a selected portion of a data seed or other data constant that can be stored at the PSC 120 and then combined with the UID and encrypted. These sent items are particular for the session and handshake for the first device service only. This process can then be repeated for every device service that is required, through device service N. This is represented by similar sequence event 910-N that involves similar request 911-N and similar response 912-N.

At a following sequence event 920, the mobile activation services component 116 on the device can send a request 921 to the activation service 130. This request 921 can ask for a handshake between the device and server, and can include all of the data items that were returned from PSC 120 earlier, such as the device serial number, all of the session reference identifiers, and/or all of the selected portions of a data seed or constant combined with the UID and encrypted, among other possible data items. In response to request 921, the activation service 130 at response 922 can then look up the device serial number at a trusted database, such as SOR 140, which can then return the PSC manifest stored at SOR 140 for that device serial number.

At the next sequence event 930, the activation service 130 can send a request 931 to the PSCTool 132. This request 931 can ask for a handshake between the activation service 130 and the PSCTool 132, which request can serve to validate the returned PSC manifest. Accordingly, request 931 can include the returned PSC manifest and various data items, such as the device serial number, all of the session reference identifiers, and all of the portions of an encrypted UID and data seed or constant combination that were returned earlier from PSC 120. Using this information, the PSCTool 132 can then validate the PSC manifest and, if the PSC manifest is found to be valid, generate a plurality of keys and key identifiers as a result. In particular, a specific server side key and key identifier can be generated for each of the desired device services 1 through N. These keys and key identifiers can then be passed back to the activation service 130 at response 932 from the PSCTool 132.

At a following sequence event 940-1, a request 941-1 can be sent from the activation service 130 to the device service 134-1, which request includes the device serial number or other identifying information, as well as the server side key and key identifier for device service 134-1. Using these data items and its own master key, the device service 134-1 can then generate a specific authorization token "SKauth1" for its own service being used or accessed on the specific user device at issue. This specific SKauth1 token can then be returned to activation service 130 from the device service 134-1 at response 942-1. This process can then be repeated for every device service that is required, through device service N. This is represented by similar sequence event 940-N including request 941-N to and response 942-N from device service 134-N. Each such iteration of this process then returns a respective authorization token "SKauthN" for the device service that is desired. All of these SKauthN tokens, as well as any pertinent identifiers are then passed back from the activation service 130 to the mobile activation services component 116 at subsequent response 943.

At the next sequence event 950-1, the mobile activation services component 116 sends a request 951-1 to the PSC 120 to set up the PSC with the specific SKauth1 activation token for device service 1, where this request 951-1 can include at least the SKauth1 token, and a session reference identifier, for example. The PSC 120 can accept and store these items, and then provide a suitable response 952-1 back to the mobile activation services component 116 that this has been accomplished. This process can then be repeated for every device service that is required, through device service N. Again, this can be represented by similar sequence event 950-N, including its respective request 951-N and response 952-N, whereupon this multiple device services handshake is then finished. As will be readily appreciated, the subject device, which again can be user device 110, for example, has tokens SKauth1 through SKauthN that have been specifically computed just for that device, and are ready to be used at some later time for each of the various device services 1 through N. The process for a subsequent registration or use of a device service can be similar to that which is set forth above for the initial activation by activation service 130.

Figure 10:
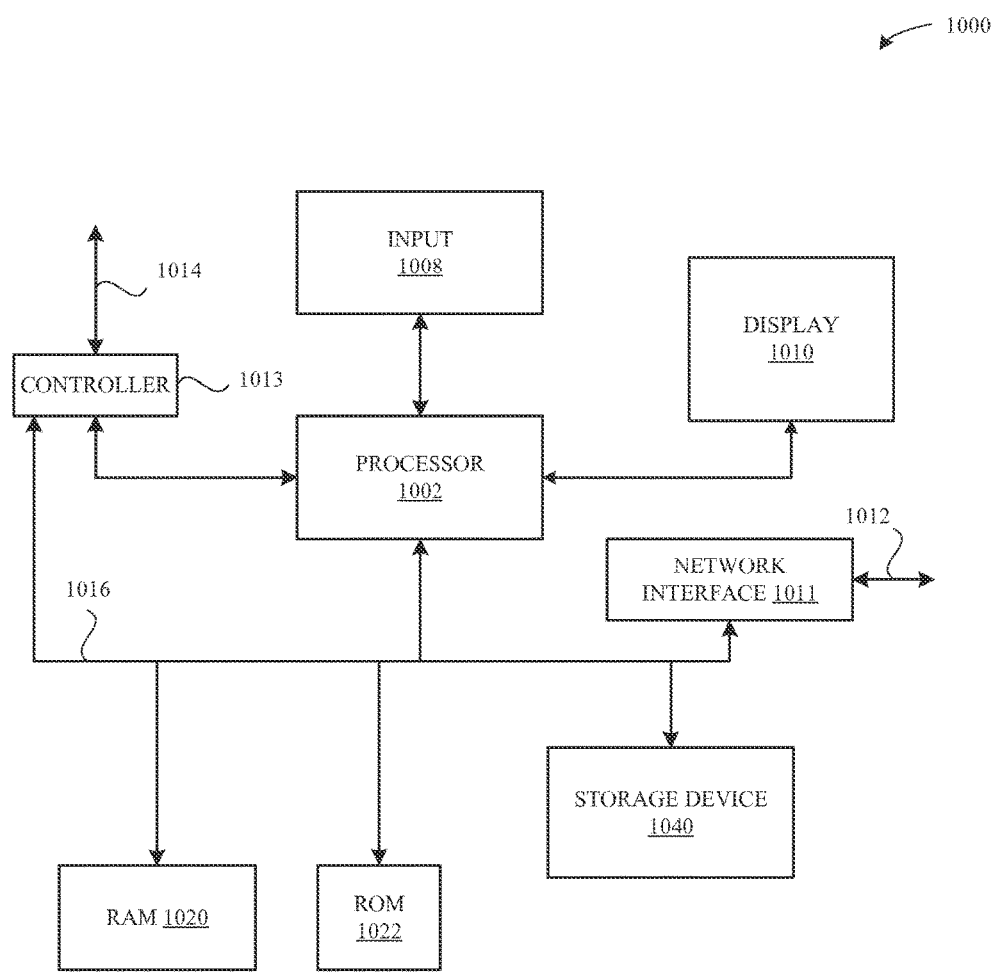
FIG. 10 illustrates in block diagram format an exemplary computing device that can be used to implement the various components and techniques described herein according to various embodiments of the present disclosure.

FIG. 10 illustrates in block diagram format an exemplary computing device 1000 that can be used to implement the various components and techniques described herein according to various embodiments of the present disclosure. In particular, the detailed view illustrates various components that can be included in the user device 110 illustrated in FIG. 1, among other possible user devices. As shown in FIG. 10, the computing device 1000 can include a processor 1002 that represents a microprocessor or controller for controlling the overall operation of computing device 1000. The computing device 1000 can also include a user input device 1008 that allows a user of the computing device to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, a movie or other AV or media content). A data bus 1016 can facilitate data transfer between at least a storage device 1040, the processor 1002, and a controller 1013. The controller 1013 can be used to interface with and control different equipment through and equipment control bus 1014. The computing device 1000 can also include a network/bus interface 1011 that couples to a data link 1012. In the case of a wireless connection, the network/bus interface 1011 can include a wireless transceiver.

The computing device 1000 can also include a storage device 1040, which can comprise a single disk or a plurality of disks (e.g., hard drives), and can include a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device configured to activate an electronic device, the computing device comprising:
    at least one hardware processor; and
    at least one memory storing instructions that, when executed by the at least one hardware processor, cause the computing device to implement an activation manager configured to:
        receive an activation request for the electronic device;
        receive at least one trusted data item that was previously stored onto the electronic device at a secure location, wherein the at least one trusted data item is associated with a seed component that is divided into multiple seed segments, and each seed segment is combined with a unique device identifier associated with the electronic device to produce a respective unique combination;
        receive at least one current data item stored on the electronic device; and
        in response to determining, based on at least one of the unique combinations, that the at least one trusted data item compares favorably with the at least one current data item:
    send an authorization to activate the electronic device, wherein at least one different unique combination remains available for future activations associated with the electronic device.

2. The computing device of claim 1, wherein the at least one current data item is encrypted and compares favorably with the at least one trusted data item based on a correct token being returned for the at least one current data item.

3. The computing device of claim 1, wherein:
a given seed component identifies manufacturing details of the electronic device, and each seed segment of the given seed component corresponds to a respective service usage.

4. The computing device of claim 3, wherein, for the given seed component, each seed segment is combined with the unique device identifier using different cryptographic primitives.

5. The computing device of claim 1, wherein a future activation involves enabling the electronic device to access a service that is not currently available to the electronic device.

6. The computing device of claim 1, wherein the activation manager is further configured to:
    remove the at least one of the unique combinations subsequent to sending the authorization.

7. The computing device of claim 1, wherein the secure location is a factory where at least a portion of the electronic device was made, or a post-manufacture field location where a trusted source obtained the at least one trusted data item stored on the electronic device.

8. The computing device of claim 1, wherein the at least one trusted data item received at the activation manager is sent from a separate and securely maintained database that stores a plurality of trusted data items for multiple electronic devices.

9. The computing device of claim 1, wherein the activation manager is further configured to:
    facilitate a provision of one or more additional trusted data items onto the electronic device after sending the authorization to activate the electronic device.

10. A method performed by a device services manager for providing services to an electronic device, the method comprising, at the device services manager:
    receiving at least one trusted data item that was previously stored onto the electronic device at a secure location, wherein the at least one trusted data item is associated with a seed component that is divided into multiple seed segments, and each seed segment is combined with a unique device identifier associated with the electronic device to produce a respective unique combination;
    receiving at least one current data item stored on the electronic device; and in response to determining, based on at least one of the unique combinations, that the at least one trusted data item compares favorably with the at least one current data item:

sending an authorization to activate the electronic device, wherein at least one different unique combination remains available for future activations associated with the electronic device.

11. The method of claim 10, wherein the at least one current data item is encrypted and compares favorably with the at least one trusted data item based on a correct token being returned for the at least one current data item.

12. The method of claim 10, wherein:
a given seed component identifies manufacturing details of the electronic device, and each seed segment of the given seed component corresponds to a respective service usage.

13. The method of claim 12, wherein, for the given seed component, each seed segment is combined with the unique device identifier using different cryptographic primitives.

14. The method of claim 10, wherein a future activation involves enabling the electronic device to access a service that is not currently available to the electronic device.

15. The method of claim 10, wherein the secure location is a factory where at least a portion of the electronic device was made, or a post-manufacture field location where a trusted source obtained the at least one trusted data item stored on the electronic device.

16. The method of claim 10, wherein the at least one trusted data item received at the device services manager is sent from a separate and securely maintained database that stores a plurality of trusted data items for multiple electronic devices.

17. The method of claim 16, wherein the at least one trusted data item stored at the separate and securely maintained database was recorded to the database from a secure manifest.

18. The method of claim 10, further comprising:
facilitating a provision of one or more additional trusted data items onto the electronic device after sending the authorization to activate the electronic device.

19. A non-transitory computer readable storage medium configured to store instructions that, when executed by at least one processor included in a computing device, cause the at least one processor to implement an activation manager configured to activate an electronic device, by carrying out steps that include:

receiving an activation request for the electronic device;

receiving at least one trusted data item that was previously stored onto the electronic device at a secure location, wherein the at least one trusted data item is associated with a seed component that is divided into multiple seed segments, and each seed segment is combined with a unique device identifier associated with the electronic device to produce a respective unique combination;

receiving at least one current data item stored on the electronic device; and in response to determining, based on at least one of the unique combinations, that the at least one trusted data item compares favorably with the at least one current data item:

sending an authorization to activate the electronic device, wherein at least one different unique combination remains available for future activations associated with the electronic device.

20. The non-transitory computer readable storage medium of claim 19, wherein the steps further include:

removing the at least one of the unique combinations subsequent to sending the authorization.

* * * * *